No. 833,125. PATENTED OCT. 9, 1906.
W. B. COWLES.
ELECTRIC SYSTEM FOR OPERATING BULKHEAD DOORS, HATCHES, &c.
APPLICATION FILED JULY 11, 1904.

WITNESSES:
W. Max. Duvall.
John H. Hall

INVENTOR
W. B. Cowles,
BY
Wilkinson & Fisher,
ATTORNEYS.

No. 833,125. PATENTED OCT. 9, 1906.
W. B. COWLES.
ELECTRIC SYSTEM FOR OPERATING BULKHEAD DOORS, HATCHES, &c.
APPLICATION FILED JULY 11, 1904.

Witnesses
John H. Hall
W. May. Durall.

Inventor,
W. B. Cowles,
by Wilkinson & Fisher
Attorneys.

No. 833,125. PATENTED OCT. 9, 1906.
W. B. COWLES.
ELECTRIC SYSTEM FOR OPERATING BULKHEAD DOORS, HATCHES, &c.
APPLICATION FILED JULY 11, 1904.

UNITED STATES PATENT OFFICE.

WILLIAM BARNUM COWLES, OF CLEVELAND, OHIO, ASSIGNOR TO THE "LONG ARM" SYSTEM COMPANY, OF CLEVELAND, OHIO, A CORPORATION OF OHIO.

ELECTRIC SYSTEM FOR OPERATING BULKHEAD DOORS, HATCHES, &c.

No. 833,125. Specification of Letters Patent. Patented Oct. 9, 1906.

Application filed July 11, 1904. Serial No. 216,142.

*To all whom it may concern:*

Be it known that I, WILLIAM BARNUM COWLES, a citizen of the United States, residing at Cleveland, in the county of Cuyahoga and State of Ohio, have invented certain new and useful Improvements in Electric Systems for Operating Bulkhead Doors, Hatches, &c.; and I do hereby declare the following to be a full, clear, and exact description of the invention, such as will enable others skilled in the art to which it appertains to make and use the same.

My invention relates to improvements in apparatus for operating bulkhead doors, hatches, or the like by means of electricity; for operating said doors whether from a distant point or at the door itself; for operating a series of doors or hatches from a central station; for operating the doors or hatches by hand in case it should become necessary or desirable to do so, and for signaling when the door or hatch or the like is in any predetermined position.

My invention also relates to improvements in the means for cutting off the electric current when the load on the motor becomes excessive and also for signaling when the door is closed.

My invention also consists in certain details of apparatus and certain combinations and arrangements of parts, as will be hereinafter more fully described and claimed.

My present invention relates more especially to improvements on the general system and the apparatus used in connection therewith as described in United States Patent to G. H. Hill, No. 650,973, granted June 5, 1900; to F. T. Bowles, No. 651,004, granted June 5, 1900; to myself, No. 729,280, granted May 26, 1903, and to myself, No. 743,252, granted November 3, 1903.

My present invention will be understood by reference to the accompanying drawings, in which the same parts are indicated by the same characters throughout the several views.

Referring first to Figs. 1 to 6, A represents the frame of the door, which is secured to the bulkhead and provided with the usual tighteners, which not being a part of my present invention will not be further described herein. To the bulkhead I also attached a stop or buffer A' to limit the upward travel of the door. B represents the door, carrying the curved worm-rack B', similar to that shown in United States Patent No. 749,252, hereinbefore referred to. C represents an electric motor carrying on its armature-shaft a pinion C', which meshes in the idler D on the shaft D', which idler meshes with the gear E, splined on the sleeve F. This sleeve terminates at its lower end in the worm F', which is preferably hollow, as shown, and has secured on the inside thereof the sleeve $F^2$, which carries the roller-bearings $f$. This sleeve $F^2$ is loose on a fixed shaft G, which is secured at one end in the bridge K, which spans the door-frame, and at the other end in the casing K', which for convenience in assembling is made separate from but is secured to the casing fast to the door-frame. This shaft G is shouldered, as $g$, $g'$, and $g^2$, and is hollowed out, as $g^3$, for purposes of lubrication. The collars H and H' and $H^2$ are all loose on this shaft G. Between the collars H and H' and inclosed in the sleeve F is a stout coil-spring I, which is held under heavy compression between said collars, the amount of the initial compression of the spring being regulated by means of the nuts G' and $G^2$. The sleeve F is provided with a thickened head $F^3$, shouldered, as at $f^3$, to provide a bearing for the upper antifriction-bearing $f'$, and this thickened portion $F^3$ is provided with an annular groove $f^4$ to receive the yoke L, which is pivotally connected, by means of the pin L', to the arm M, which is pivoted, by means of the pin $m$, to the casing K'. This arm M is provided with a head M', having inclined faces $m'$ and a central operating-lug $m^2$. When the spring I is under normal compression, this arm M will be in the position shown in Figs. 3 and 6, with the lug $m^2$ midway between the two lugs $n$ and $n'$ on the yoke N, which yoke is fast to the rock-shaft N', connected to the cut-out or limit switch $N^2$. This switch is provided with two insulated contact-segments $n^4$ and $n^5$, which normally make contact with the contact-pieces $n^2$ and $n^3$, and thus complete the circuit when it is otherwise closed; but when this limit-switch is thrown out of contact the electric circuit to the motor is broken. This limit-switch is preferably inclosed in the same box O with a suitable motor-controller O', which is shown in diagram in Fig. 18. This controller is designed to be operated by a person at the door by means of the handle $O^2$. The compression of the spring I is so adjusted that the sleeve F will be substantially rigid against longitudinal movement on the shaft G during the ordinary operation of opening or closing the door; but if on closing the door any serious obstacle is encountered—such, for instance, as a piece of timber, a bag of coal, or any metallic substance—the resistance of the door to any further downward motion will cause the worm-rack B' to react on the worm-wheel F', pushing the sleeve F upward against the action of the spring. This motion of the sleeve F will cause the yoke L to swing the arm M about its pivot, causing the lug $m^2$ to strike the lug $n'$, rocking the yoke N, and causing the shaft N' to throw the limit-switch $N^2$ out of contact, thus breaking the circuit and cutting off the current to the motor. The same result happens when the door is jammed down firmly on its seat. When the door reaches the upward limit of its travel, it is stopped by the buffer A', or should the door encounter any other obstruction in opening the worm-wheel F' will be pushed downward, compressing the spring and rocking the shaft N' in the opposite direction, breaking the contacts made by the limit-switch $N^2$, and thus breaking the circuits. After the circuit has been broken by the motion of the limit-switch, as just described, it cannot be closed again until either the pressure is relieved, when the spring I will automatically restore the parts to the initial position, or until the door has moved a sufficient distance after the current has been turned on for moving the door in the opposite direction. The door may be closed only from the emergency-station through the solenoid $O^3$; but it may be opened or closed by means of the controller operated by hand at the door or by hand-power, as will be hereinafter described. I have provided an emergency-station from which not only the single door in question, but any number of doors, hatches, or the like may be closed by a single operator, which will now be described. This emergency-station consists of a switch mechanism designed to operate an emergency-switch at each door, by which latter the current is thrown onto the motor for operating the door. The emergency-switch at each door consists of two movable contact-segments $t^2$ $t^3$ and two fixed contacts $t$ and $t'$, the movable contacts being mounted to rotate on the same axis with the limit-switch, though independent thereof. These emergency-switches, one at each door, are each operated by a solenoid $O^3$, the core of which connects, by means of a link $t^6$, with a lug $t^7$ on the sleeve $t^8$, carrying the movable contacts of the switch. The core of the solenoid is returned to its normal position by means of a suitable spring $t^9$. The emergency-switches are thus operated by completing a circuit from a source of current through the solenoids at the respective doors, and this is done by means of the emergency-station. The preferred form of emergency-station and the details thereof are shown in Figs. 8 to 17, and the electrical circuit and connections are shown diagrammatically in Fig. 18, which will hereinafter be described. In addition to the electric control of the door I provide hand mechanism for opening and closing the same, consisting of the pinion $D^2$ on the shaft D', which meshes with the pinion P on the same shaft with the pinion P', which last pinion meshes with the pinion Q on the shaft Q'. This shaft projects through the bulkhead and is adapted to have a hand-wheel $Q^2$ attached thereto on either or both sides of the bulkhead. By turning this hand-wheel the door may be opened or closed by hand independent of the electrical power mechanism.

Referring now to Figs. 7 to 17, these figures show the emergency-station by means of which the doors, hatches, or the like will be controlled from a central point, as from the bridge or pilot-house of the vessel. The emergency-station 8 comprises certain mechanism held in a suitable case, which for convenience of assembly is preferably made of two parts S' and S², provided with ears 45, which are secured together and to the bulkhead by bolts 46. Mounted in the rear portion S² of the casing is the arbor 3, which carries the loose sleeve 4, secured to or integral with the pinion 5. (See Fig. 10.) This pinion 5 meshes with the toothed sector 6 on the arm 7, (see Fig. 11,) which arm 7 is pivoted at 8 and is connected, as at 9, to a stout coil-spring 11, whose tension may be adjusted by means of the nut 12. The short end of the arm 7 is provided with an abutment 10, which strikes the stop 10ª just before the sector 6 passes out of engagement with the pinion 5. 13 represents a wheel which is secured fast to the sleeve 4 and pinion 5, and mounted on the hub of this wheel 13 is the hub 14 of a wheel 15, which is connected to said wheel 13 by the rollers 14ª, forming a roller-clutch connection which will clamp the wheel 15 to the wheel 13 when the latter is moved in one direction and which will allow the wheel 15 to turn freely on the wheel 13 when the latter is moved in the reverse direction. This wheel 15 is provided with teeth 16, which mesh in the pinion 17 on the arbor 20. This arbor also carries the gear-wheel 18 and the ratchet-wheel 22, both of which are secured to and rotate with the pinion 17. The gear-wheel 18 meshes with a similar gear-wheel 19 on the arbor 21, which gear-wheel 19 is fast to the ratchet-wheel 23. Between these ratchet-wheels 22 and 23 is mounted the double pawl 24, having engaging teeth 25 and 25ª. (See Figs. 12 and 14.) This pawl is fast on the hub 27ª of the balance-wheel 27. This balance-wheel 27 is perforated, as at 28, to allow the arbors 20 and 21 to pass therethrough. The said balance-wheel is caused to vibrate through a small angle in reverse directions by means of the spring 11, which will cause the sector 6 to rotate the pinion 5, and this will turn the wheels 13 and 15, causing the teeth 16 to rotate the pinion 17 and through it the gear-wheels 18 and 19 and the ratchet-wheels 22 and 23. Suppose the balance-wheel 27 is in the position indicated in Fig. 12. The rotation of the ratchet-wheel 22 will cause the tooth 25 of the pawl 24 to rock the balance-wheel 27, and the wheel 27 will continue revolving until the tooth 25ª engages one of the teeth of the ratchet-wheel 23. This will check the movement of the ratchet-wheel 23, and before the train of mechanism, including the ratchet-wheel 23, can continue to revolve the motion of the balance-wheel 27 must be stopped and reversed, and so this balance-wheel interposes a series of checks to the train of mechanism actuated by the spring 11, and thus retards the motion of the wheel 13. This wheel 13 carries an insulated conducting-segment 29, which is caused to pass over the brushes 30, connected to the wires 31 and 32, as will be hereinafter described. A series of incandescent-lamp sockets 33 is provided, so that when each circuit is completed a lamp 34 will glow. These lamps are behind openings 35 in the front plate 2, which openings may be closed by colored or numbered glass or mica plates 34ª. (See Fig. 10.) The wheel 13 is provided with a stop 36, which engages the arm 37 on the shaft 38, to which the hand-wheel 39 is secured. This hand-wheel is provided with a stop or stops 40, one of which engages in the notch 41 between the short lug 42 and the longer lug 43. (See Fig. 9.) This stop 40 is normally held in engagement with said notch by means of the springs 44ª and 44ᵇ, which bear on the cross-head 44, loose on the shaft 38, and tend to press the arm 37, and with it the shaft 38 and hand-wheel 39, inward. This stop 40 will therefore normally lock the wheel 13, and with it the pinion 5, against turning. If, however, the hand-wheel is pulled out against the action of the springs 44ª and 44ᵇ far enough to release the stop 40, the stop 36 on the wheel 13 will push the hand-wheel around under the influence of the spring 11. The parts are so arranged that the hand-wheel will turn through about one hundred and eighty degrees before the abutment 10 strikes the stop 10ª, and about the same time the stop 40 on the hand-wheel will have rotated around to engage one of the lugs 43. This will prevent the hand-wheel from being turned by hand beyond the desired position to the injury of the mechanism after the tension of the spring 11 has been taken off by means of the engagement of the abutment 10 with the stop 10ª. The parts may be restored to the initial position by turning the hand-wheel backward and locking the stop 40 in the notch 41. It will be seen that the balance-wheel 27 will cause the wheel 13, bearing the segment 29, to rotate slowly by a step-by-step motion and that this speed of rotation normally controlled by the spring 11 may be increased by supplementing the action of the spring by hand-power applied to turn the hand-wheel. This slow step-by-step motion is important to prevent excessive loads being thrown on the dynamo or other source of electric current when it is desired to close a series of doors or hatches or the like from an emergency-station. Thus the effect of simultaneously starting and of simultaneously closing a large number of doors or hatches would impose an excessive load upon the source of current, while by cutting the doors in circuit *seriatim* the load is distributed, and for this purpose I arrange that there shall be a brief interval between the successive closing of the circuits connected to the several doors or hatches. This is secured by the step-by-step motion of the segment already described. In order to determine whether the various doors, hatches, &c., are closed, I provide a push-button or switch 50, which when operated will cause the indicating-lamps $b\,c\,d$ to glow when these circuits are otherwise closed, as hereinafter described. Electric connections with the emergency-station are made by means of the conduits $s$ and junction-box $S^3$.

Figure 1:
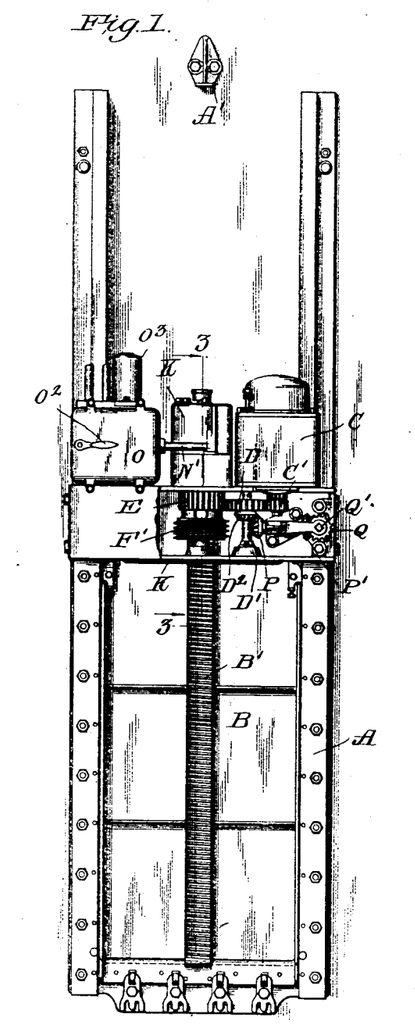
Figure 1 shows the vertical sliding watertight bulkhead-door fitted with the apparatus for opening and closing the same, parts being broken away and the door being in a closed position.
Figure 2:
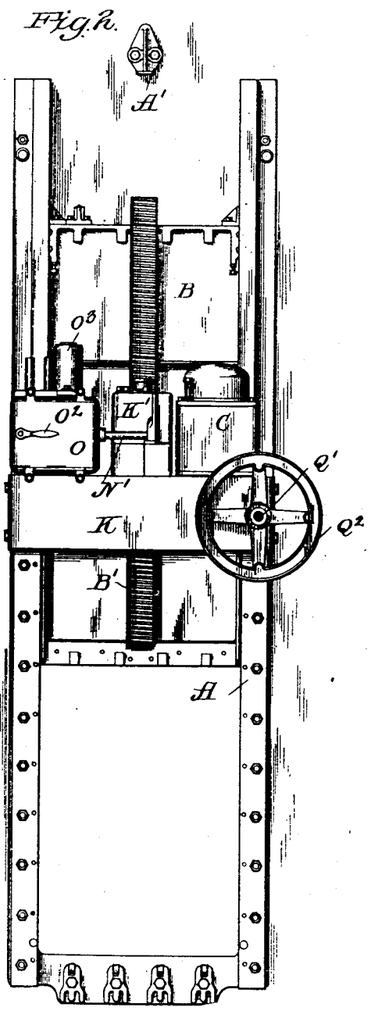
Fig. 2 is a similar view, but with the door partly open.
Figures 3, 4, 5, 6:
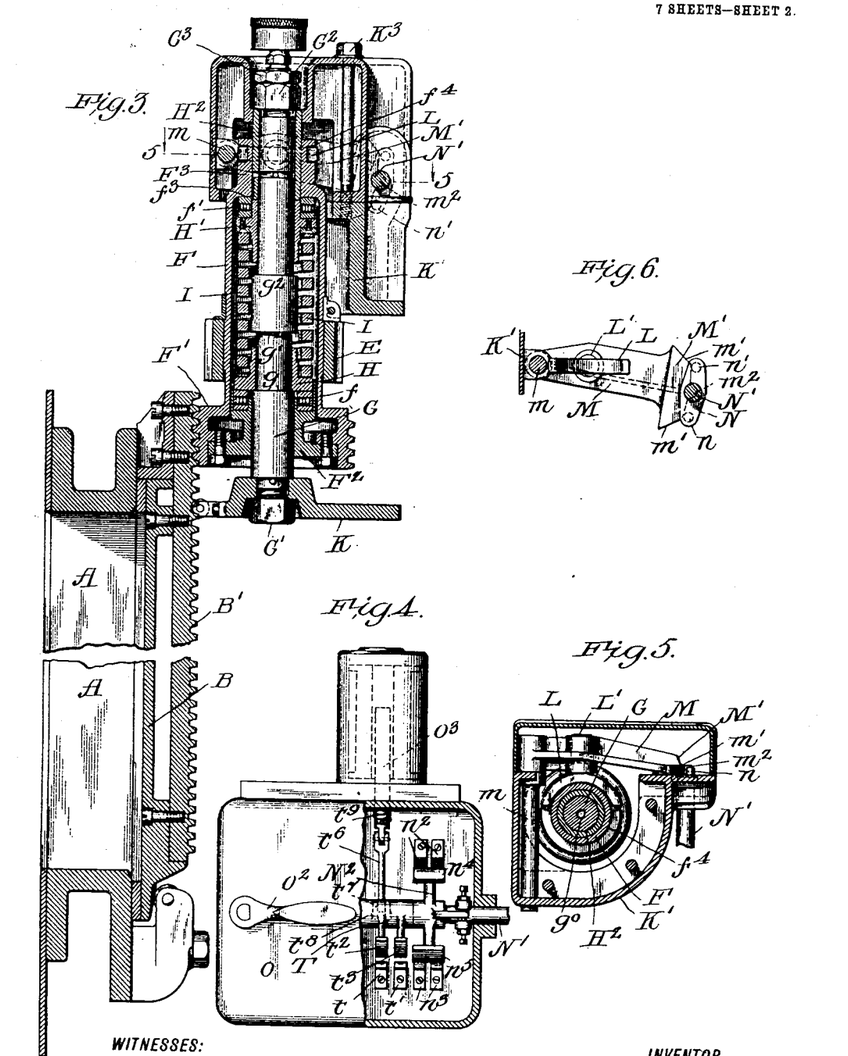
Fig. 3 is a section along the line 3 3 of Fig. 1 and looking in the direction of the arrows, the parts being shown on a large scale.
Fig. 4 is a detail showing the limit-switch, the emergency-switch, and the controller, parts being broken away.
Fig. 5 shows a section along the line 5 5 of Fig. 3 and looking in the direction of the arrows.
Fig. 6 is a detail showing the mechanism for tripping the limit-switch.
Figures 7, 8, 9:
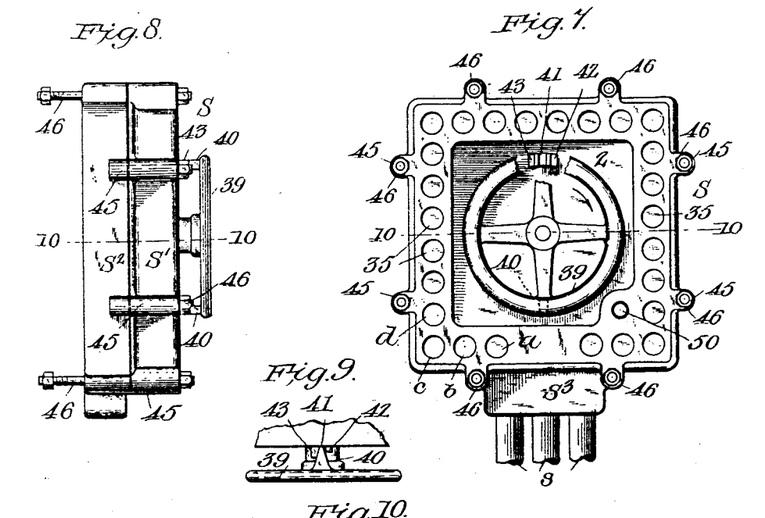
Fig. 7 is a front view of the emergency-station, parts being broken away.
Fig. 8 is an end view of the emergency-station as detached from its supports.
Fig. 9 shows the mode of locking the hand-wheel of the emergency-station in the initial position and for holding same against being rotated too far.
Figure 10:
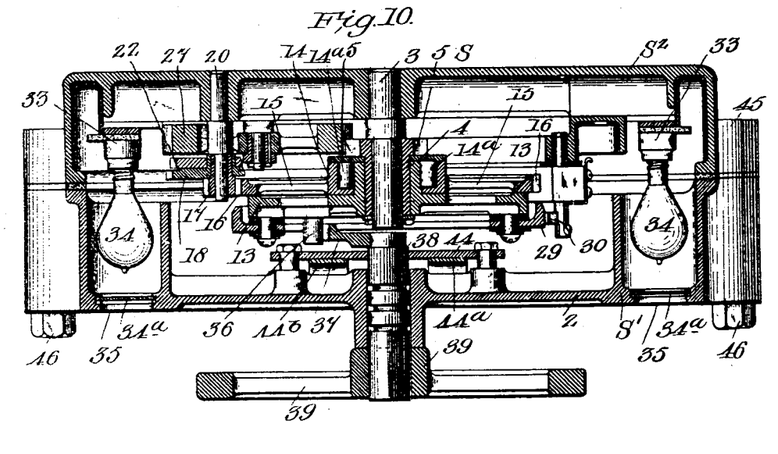
Fig. 10 shows a section of the emergency-station along the line 10 10 of Figs. 7, 8, and 11, the parts being shown on enlarged scale as to Figs. 7 and 8 and on the same scale as in Fig. 11.
Figure 11:
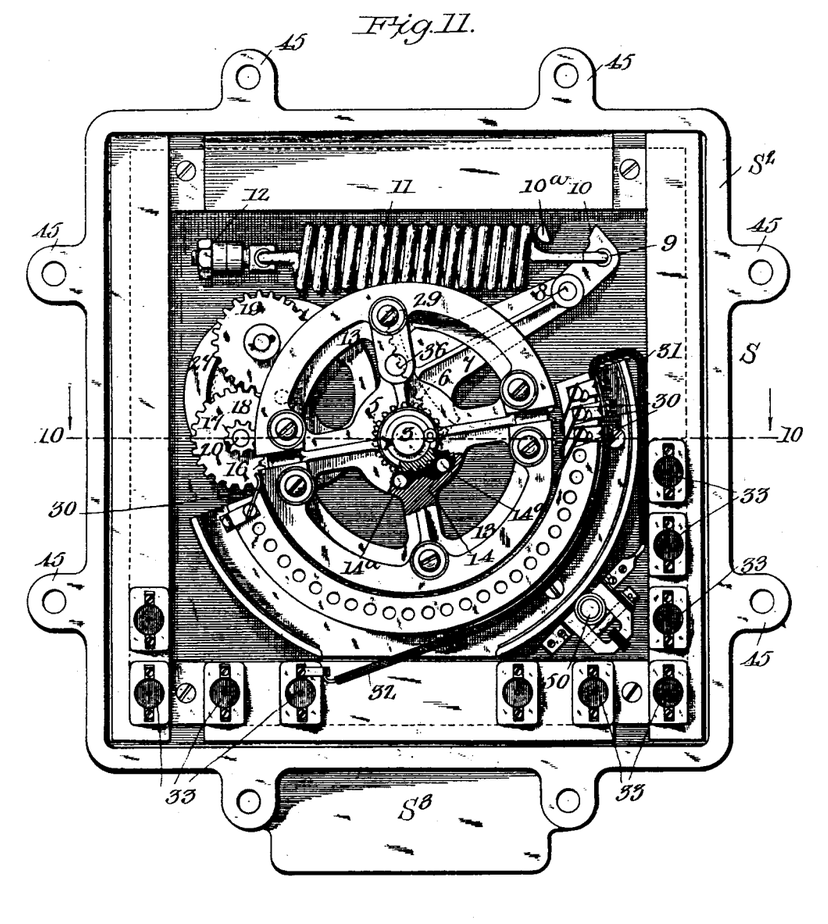
Fig. 11 shows the interior of the emergency-station after the front casing or cover thereof has been removed.
Figure 12:
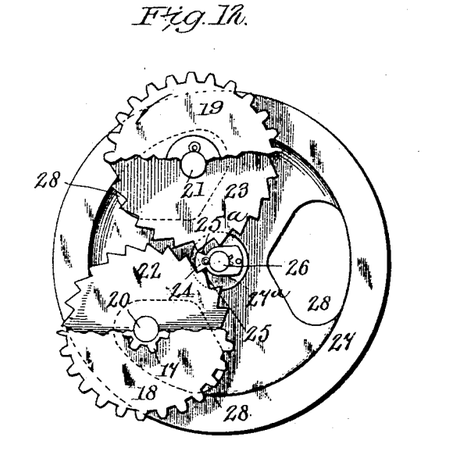
Fig. 12 shows the escapement for limiting the speed of the circuit-closing segment at the emergency-station, the parts being shown on a still further enlarged scale than is indicated in Fig. 11.
Figure 13:
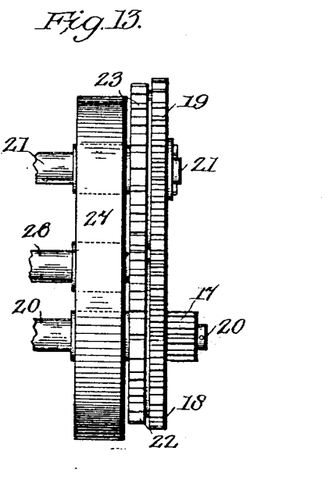
Fig. 13 is a side view of the mechanism shown in Fig. 12 looking from the left of said figure.
Figures 14, 15, 16, 17:
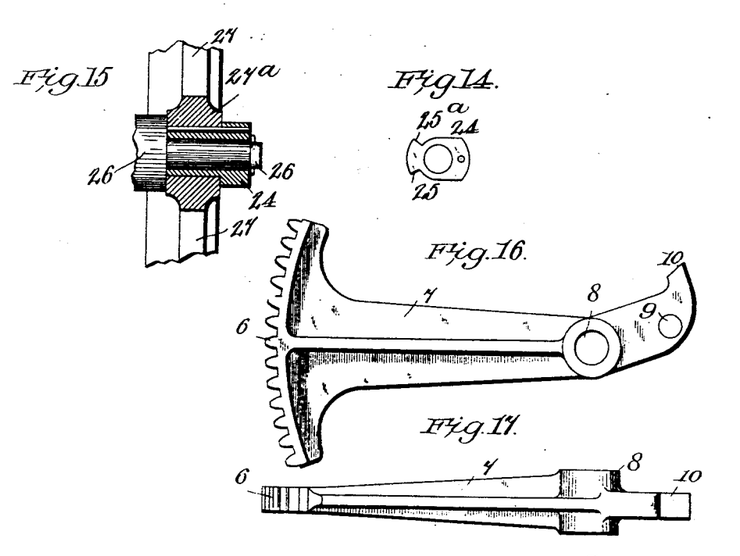
Fig. 14 is a detail showing on a somewhat larger scale the double pawl used in the escapement mechanism.
Fig. 15 is a detail showing the connection between the pawl and the balance-wheel.
Fig. 16 shows in side elevation the operating-sector at the emergency-station.
Fig. 17 is a plan view of the device shown in Fig. 16.
Figure 18:
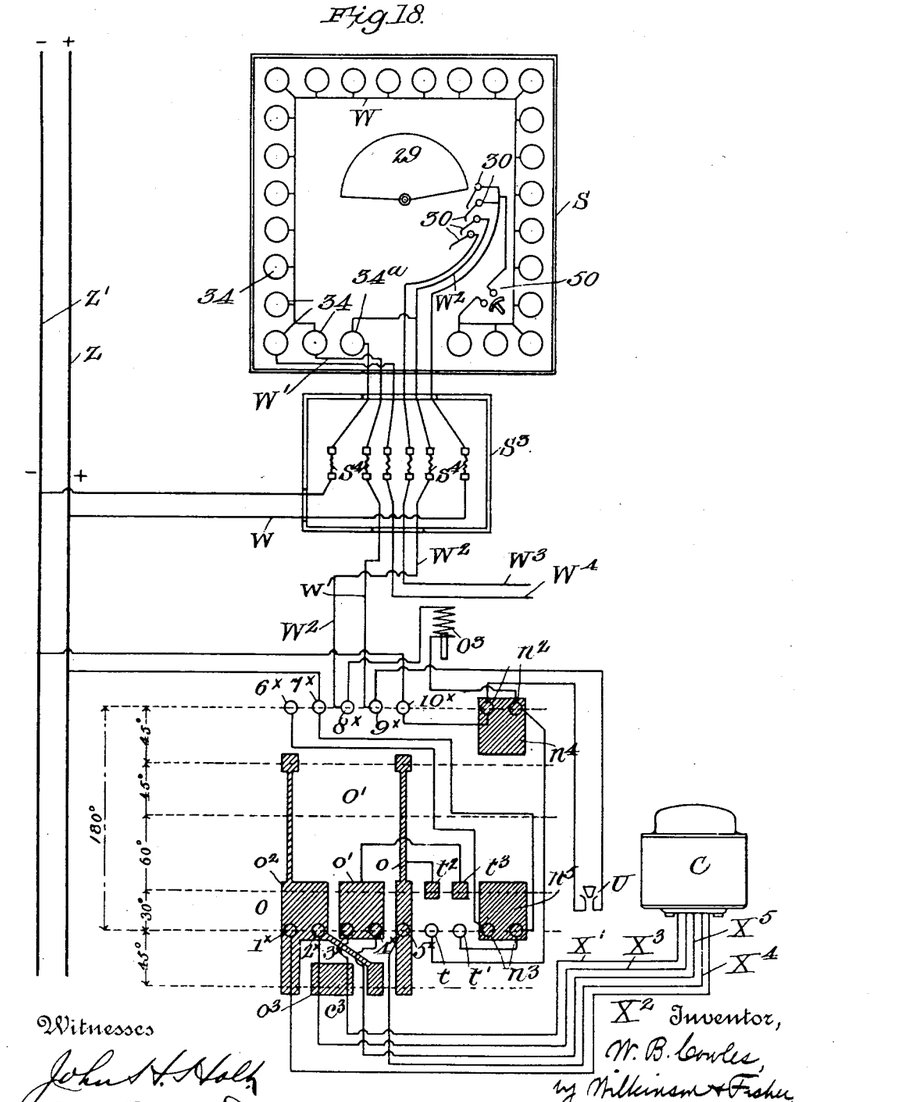
Fig. 18 is a diagram illustrating the electric connections.
Figure 19:
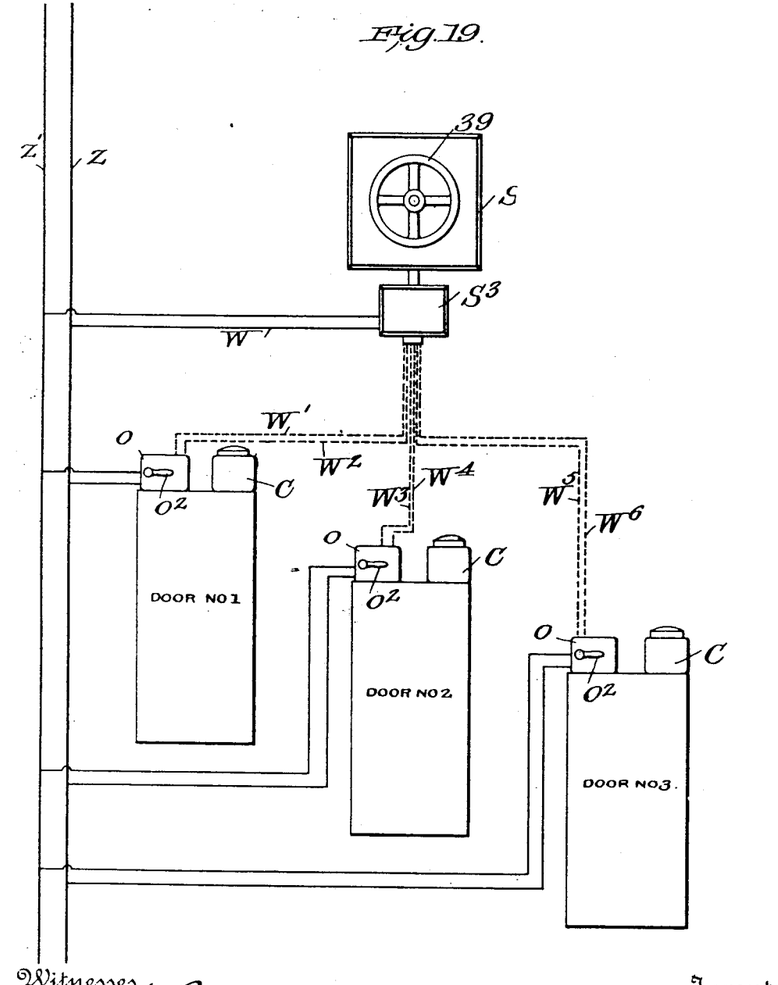
Fig. 19 is a diagram showing the connections from the ship's mains to three doors and from the three doors to the emergency-station.

Having described the construction of the parts at the emergency-station and at one of the doors, I will now describe the electric circuits and how they are completed by the operations of the apparatus, and for this purpose I will refer to the diagram Fig. 18. One terminal of each of the indicator-lamps 34 is connected to a common lead-wire W from the positive ship-main Z, while the other terminal of each lamp is connected by a separate wire, as W', to a switch U at each door. The first two stationary spring-contacts 30 are connected together to the main Z, while the successive contacts 30 are separately connected to the solenoid $O^3$ of the emergency-switch at each door. All of the wires from the emergency-station lead through the junction-box $S^3$, in which a fuse $S^4$ is connected in the circuit of each wire. In addition to the regular indicator-lamps 34 there is a red lamp $34^a$, connected as shown, which will light up as soon as the connection with the first spring-contact 30 is established and remain lighted as long as the emergency-station is in operation. The other lamps light up only when the push-button 50 is operated. The controller is contained in the left-hand end of the box O and its mechanical construction, which forms no part of this invention, is not shown. This controller, however, may be of any suitable construction for operating the motor C, which is preferably compound-wound. In the diagram the controller is shown in development, in which $1^\times$ $10^\times$ indicate the stationary contacts and $o$, $o'$, $o^2$, and $o^3$ the movable segments. Wires X' and $X^2$ lead to the motor-armature, $X^3$ and $X^4$ to the series fields, and $X^5$ to the shunt. The limit-switch and emergency-switch are both also shown in development. The electric circuits completed by the operation of the apparatus may be traced as follows: When the contact-segment 29 has moved far enough to engage the first, or preferably the first two, spring-contacts 30, which are connected together, current will flow from the positive ship-main Z through junction-box $S^3$ to the first or upper two contacts 30, segments 29, the third spring-contact 30 from the top, wire $W^2$, controller-contact $8^\times$, solenoid $O^3$, limit-switch contact $n^2$, controller-contact $10^\times$, back to the negative ship's main Z'. The current passing thus energizes the solenoid $O^3$ and causes it to operate the emergency-switch T, causing it to move contacts $t^2$ and $t^3$ into engagement with contacts $t$ and $t'$. This operation of the emergency-switch completes the circuit from the ship's mains to the motor at door No. 1, which circuit may be traced as follows: from the positive ship-main to controller-contact $7^\times$, the right-hand limit-switch, contact $n^3$, emergency-switch contacts $t'$ and $t^3$ through the controller to the motor, and back to emergency-switch contacts $t^2$ and $t$, thence through contacts $n^2$ of the limit-switch to controller-contact $10^\times$, and back to the negative ship's main. The motor then starts, and if any abnormal resistance is encountered the limit-switch will be operated, as described, and will break connection between its movable contact $n^4$ and its stationary contact $n^2$, thus cutting off the current from the motor and causing it to stop. This reverse action takes place also when the door has reached either the upper or lower limit of its travel, the movable contact $n^5$ breaking connection with the stationary contact $n^3$. It will be noted that the movable contacts of the limit-switch are normally in engagement with all of the stationary contacts thereof. When the door closes, it operates a switch U, which partially closes the circuit of the lamp intended to indicate the closure of door operated, which when the push-button 50 is operated will light up. The circuit of this lamp may be traced as follows: from the positive ship-main to wire W, through the junction-box $S^3$ to push-button 50, thence through lamp 34 (No. 1,) through indicator-wire W' to contact $9^\times$, switch U, limit-switch contact $n^2$ on left, contact $10^\times$, and back to negative ship's main. While I have shown the electrical connections from the emergency-station to one door only, this station is intended to operate a large number of doors—twenty-five in the case shown. The connections, however, from the emergency-station to all of the doors are the same— that is, two wires lead from the junction-box of the emergency-station to each door, one of these wires for carrying current to operate the emergency-switch and one for carrying current to operate the signal-lamp corresponding to the door operated. Wires $W^3$ and $W^4$ (see Figs. 18 and 19) represent the emergency-switch and indicator-wires, respectively, leading to door No. 2 and wires $W^5$ and $W^6$ (see Fig. 19) represent the emergency-switch and indicator-wires leading to door No. 3. These pairs of wires corresponding to the wires W' and W², leading to door No. 1, and all the other connections are substantially duplicates of those leading to door No. 1 and illustrated in detail in Fig. 18. As the segment 29 continues to rotate the spring-contacts 80 are brought one by one into engagement with said segment, and thus act to complete circuits to emergency-switches at the successive doors and also act to cause the indicating-lamps to be connected up successively in each case just as described above.

It will be obvious that various modifications may be made in the herein-described apparatus, in the electric connections, and in the combination and arrangement of parts which might be used without departing from the spirit of my invention.

Having thus described my invention, what I claim, and desire to secure by Letters Patent of the United States, is—

1. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit, means for adjusting the normal compression of said spring, and means controlled by the yielding of said spring for cutting off the current from said motor, substantially as described.

2. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit, means for adjusting the normal compression of said spring, and a cut-out switch controlled by the yielding of said spring, for cutting off the current from said motor, substantially as described.

3. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, and means controlled by the axial motion of said sleeve, due to the yielding of said spring, for cutting off the current from said motor when the load becomes excessive, substantially as described.

4. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, and a cut-out switch controlled by the axial motion of said sleeve, due to the yielding of said spring, for cutting off the current from said motor when the load becomes excessive, substantially as described.

5. In a system of the character described, the combination with a door or hatch and a worm-rack secured thereto, of an electric motor, and a worm-wheel driven by said motor engaging in said rack, a coil-spring under compression connected to said worm-wheel, and yielding when the load on said gearing exceeds a predetermined limit, means for adjusting the compression of said spring, and a cut-out switch controlled by the yielding of said spring, for cutting off the current from said motor, substantially as described.

6. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit in either opening or closing the door or hatch, means for adjusting the compression of said spring, and means automatically controlled by the yielding of said spring for cutting off the current from said motor when the load becomes excessive, substantially as described.

7. In a system of the character described, the combination with a door or hatch, of an electric motor, and gearing driven by said motor for operating the door or hatch, a coil-spring under compression conneced to a member of said gearing, and yielding when the load on said gearing exceeds a predetermined limit in either opening or closing the door or hatch, means for adjusting the compression of said spring, and a cut-out switch automatically controlled by the yielding of said spring, for cutting off the current from said motor when the load becomes excessive, substantially as described.

8. In a system of the character described, the combination with a door or hatch, of an electric motor, and gearing driven by said motor for operating the door or hatch, a spring under compression connected to a member of said gearing, and yielding in when the load on said gearing exceeds a predetermined limit in either opening or closing, means for turning on the current to said motor either from a distance or locally, and means automatically controlled by the yielding of said spring for cutting off the current from said motor when the load becomes excessive, substantially as described.

9. In a system of the character described, the combination with a door or hatch, of an electric motor, and gearing driven by said motor for operating the door or hatch, a spring under compression connected to a member of said gearing, and yielding when the load on said gearing exceeds a predetermined limit in either opening or closing, means for turning on the current to said motor either from a distance or locally, and a cut-out switch automatically controlled by the yielding of said spring, for cutting off the current from said motor when the load becomes excessive, substantially as described.

10. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit, means for adjusting the normal compression of said spring, means for turning on the current to said motor either from a distance or locally, and means controlled by the yielding of said spring for cutting off the current from said motor, substantially as described.

11. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit, means for adjusting the normal compression of said spring, means for turning on the current to said motor either from a distance or locally, and a cut-out switch controlled by the yielding of said spring, for cutting off the current from said motor, substantially as described.

12. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, means for turning on the current to said motor either from a distance or locally, and means controlled by the yielding of said spring for cutting off the current from said motor when the load becomes excessive, substantially as described.

13. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, means for turning on the current to said motor either from a distance or locally, and a cut-out switch controlled by the axial motion of said sleeve, due to the yielding of said spring for cutting off the current from said motor when the load becomes excessive, substantially as described.

14. In a system of the character described, the combination with a door or hatch and a worm-rack secured thereto, of an electric motor, and a worm-wheel driven by said motor engaging in said rack, a coil-spring under compression connected to said worm-wheel, and yielding when the load on said gearing exceeds a predetermined limit, means for adjusting the compression of said spring, means for turning on the current to said motor either from a distance or locally, and a cut-out switch controlled by the yielding of said spring, for cutting off the current from said motor, substantially as described.

15. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit in either opening or closing the door or hatch, means for adjusting the compression of said spring, means for turning on the current to said motor either from a distance or locally, and means automatically controlled by the yielding of said spring for cutting off the current from said motor when the load becomes excessive, substantially as described.

16. In a system of the character described, the combination with a door or hatch, of an electric motor, and gearing driven by said motor for operating the door or hatch, a coil-spring under compression connected to a member of said gearing, and yielding when the load on said gearing exceeds a predetermined limit in either opening or closing the door or hatch, means for adjusting the compression of said spring, means for turning on the current to said motor either from a distance or locally, and a cut-out switch automatically controlled by the yielding of said spring, for cutting off the current from said motor when the load becomes excessive, substantially as described.

17. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, a pivoted arm controlled by the axial motion of said sleeve, due to the yielding of said spring, and means operated by said arm for cutting off the current from said motor when the load becomes excessive, substantially as described.

18. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve yielding when the axial pressure on said worm-wheel exceeds a predetermined limit, a pivoted arm controlled by the axial motion of said sleeve, due to the yielding of said spring, and a cut-out switch operated by said arm for cutting off the current from said motor when the load becomes excessive, substantially as described.

19. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, a pivoted arm controlled by the axial motion of said sleeve, due to the yielding of said spring, a rock-shaft, and a cut-out switch connected thereto, both operated by said arm, for cutting off the current from said motor when the load becomes excessive, substantially as described.

20. In a system of the character described, the combination with a door or hatch and a worm-rack secured thereto, of an electric motor, a fixed shaft, a sleeve mounted on said shaft, a worm-wheel secured to or integral with said sleeve and engaging in said rack, gearing for driving said worm-wheel from said motor, a coil-spring under compression mounted between said shaft and said sleeve and yielding when the axial pressure on said worm-wheel exceeds a predetermined limit, a pivoted arm controlled by the axial motion of said sleeve, due to the yielding of said spring, a rock-shaft, and a cut-out switch connected thereto, both operated by said arm, for cutting off the current from said motor when the load becomes excessive, with means for turning on the current either from a distance or locally at the door, substantially as described.

21. In a system of the character described, the combination with a series of doors, of an electric motor at each door, gearing driven by said motor for operating the door, a spring at each door under compression and connected to a member of said gearing, and yielding when the load on said gearing exceeds a predetermined limit, means for turning on the current to all of said motors *seriatim* from a distance, means for turning the current on or off at each door locally, and means controlled by the yielding of said spring for cutting off the current from its motor, substantially as described.

22. In a system of the character described, the combination with a series of doors, of an electric motor at each door, gearing driven by said motor for operating the door, a spring at each door under compression and connected to a member of said gearing, and yielding when the load on said gearing exceeds a predetermined limit, means for turning the current on or off to all of said motors *seriatim* from a distance, means for turning on the current at each door, locally, and a cut-out switch at each door controlled by the yielding of said spring for cutting off the current from its motor, substantially as described.

23. In a system of the character described, the combination with a series of doors and a worm-rack secured thereto, of an electric motor at each door, and a worm-wheel driven by said motor engaging in said rack, a coil-spring at each door under compression and connected to said worm-wheel, and yielding when the load on the gearing exceeds a predetermined limit, means for turning on the current *seriatim* from a distance, means for adjusting the compression of said spring, and a cut-out switch controlled by the yielding of said spring, for cutting off the current from said motor, substantially as described.

24. In a system of the character described, the combination with a series of doors and a worm-rack secured thereto, of an electric motor at each door and a worm-wheel driven by said motor engaging in said rack, a coil-spring at each door under compression and connected to said worm-wheel, and yielding when the load on the gearing exceeds a predetermined limit, means for turning on the current to all of said doors *seriatim* from a distance, and means for turning the current on or off at each door locally, means for adjusting the compression of said spring, and a cut-out switch controlled by the yielding of said spring, for cutting off the current from said motor, substantially as described.

25. In a system of the character described, the combination with a series of doors, of an electric motor at each door, gearing driven by said motor for operating the door, a spring at each door under compression and connected to a member of said gearing, and yielding when the load on said gearings exceeds a predetermined limit, automatic step-by-step mechanism for turning on the current to all of said motors *seriatim* from a distance, means for turning the current on or off at each door locally, and means controlled by the yielding of said spring for cutting off the current from its motor, substantially as described.

26. In a system of the character described, the combination with a series of doors, of an electric motor at each door, gearing driven by said motor for operating the door, a spring at each door under compression and connected to a member of said gearing, and yielding when the load on said gearing exceeds a predetermined limit, automatic step-by-step mechanism for turning on the current to all of said motors *seriatim* from a distance, means for turning the current on or off at each door locally, and a cut-out switch at each door controlled by the yielding of said spring for cutting off the current from its motor, substantially as described.

27. In a system of the character described, the combination with a plurality of electric motors with mechanism driven thereby, of automatic step-by-step mechanism for turning on the current to said motors *seriatim* from a distant point, substantially as described.

28. In a system of the character described, the combination with a plurality of electric motors with mechanism driven thereby, of automatic step-by-step mechanism for turning on the current to said motors *seriatim* from a distant point, and automatic mechanism for cutting off the current from any one of said motors when the load on said motor exceeds a predetermined limit, substantially as described.

29. In a system of the character described, the combination with a plurality of electric motors with mechanism driven thereby, of automatic step-by-step mechanism for turning on the current to said motors *seriatim* from a distant point, and automatic mechanism for cutting off the current from any one of said motors when the load on said motor exceeds a predetermined limit, substantially as described.

30. In a system of the character described, the combination with a plurality of electric motors with mechanism driven thereby, of means for turning on the current to said motors *seriatim* from a distant point, with means for indicating at the distant point when the current is turned on to and off the motor, substantially as described.

31. In a system of the character described, the combination with a plurality of electric motors with mechanism driven thereby, of automatic step-by-step mechanism for turning on the current to said motors *seriatim* from a distant point, with means for indicating at the distant point when the current is turned on to and off from each motor, substantially as described.

32. In a system of the character described, the combination with a plurality of electric motors with mechanism driven thereby, of means for turning on the current to said motors *seriatim* from a distant point, and automatic mechanism for cutting off the current from any one of said motors when the load on said motor exceeds a predetermined limit, with means for indicating at the distant point when the current is turned on to and off from each motor, substantially as described.

33. In a system of the character described, the combination with a plurality of electric motors with mechanism driven thereby, of automatic step-by-step mechanism for turning on the current to said motors *seriatim* from a distant point, and automatic mechanism for cutting off the current from any one of said motors when the load on said motor exceeds a predetermined limit, with means for indicating at the distant point when the current is turned on to and off from each motor, substantially as described.

34. In a system of the character described, the combination with a plurality of electric motors with mechanism driven thereby, of automatic step-by-step mechanism for turning on the current to said motors *seriatim* from a distant point, comprising a spring under tension, a train of gearing operated by said spring, a conducting-segment operated by said train of gearing, a pair of ratchet-wheels driven in reverse directions by said train of gearing, a balance-wheel, and a double pawl fast on the shaft of said balance-wheel and adapted to alternately engage said ratchet-wheels, substantially as described.

35. In a system of the character described, the combination with a plurality of electric motors with mechanism driven thereby, of automatic step-by-step mechanism for turning on the current to said motors *seriatim* from a distant point, comprising a spring under tension, a train of gearing operated by said spring, a conducting-segment operated by said train of gearing, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, substantially as described.

36. In a system of the character described, the combination with a plurality of electric motors with mechanism driven thereby, of automatic step-by-step mechanism for turning on the current to said motors *seriatim* from a distant point, comprising a spring under tension, a train of gearing operated by said spring, a conducting-segment operated by said train of gearing, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, substantially as described.

37. In a system of the character described, the combination with a plurality of electric motors with mechanism driven thereby, of means for turning on the current to said motors *seriatim* from a distant point, comprising a spring under tension, a train of gearing operated by said spring, a conducting-segment operated by said train of gearing, a pair of ratchet-wheels driven in reverse directions by said train of gearing, a balance-wheel, and a double pawl fast on the shaft of said balance-wheel and adapted to alternately engage said ratchet-wheels, with means for indicating at the distant point when the current is turned on to and off the motor, substantially as described.

38. In a system of the character described, the combination with a plurality of electric motors, with mechanism driven thereby, of automatic step-by-step mechanism for turning on the current to said motors *seriatim* from a distant point, comprising a spring under tension, a train of gearing operated by said spring, a conducting-segment operated by said train of gearing, a pair of ratchet-wheels driven in reverse directions by said train of gearing, a balance-wheel, and a double pawl fast on the shaft of said balance-wheel and adapted to alternately engage said ratchet-wheels, with means for indicating at the distant point when the current is turned on to and off from each motor, substantially as described.

39. In a system of the character described, the combination with a plurality of electric motors with mechanism driven thereby, of means for turning on the current to said motors *seriatim* from a distant point, comprising a spring under tension, a train of gearing operated by said spring, a conducting segment operated by said train of gearing, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, with means for indicating at the distant point when the current is turned on to and off from each motor, substantially as described.

40. In a system of the character described, the combination with a plurality of electric motors with mechanism driven thereby, of automatic step-by-step mechanism for turning on the current to said motors *seriatim* from a distant point, comprising a spring under tension, a train of gearing operated by said spring, a conducting segment operated by said train of gearing, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, with means for indicating at the distant point when the current is turned on to and off from each motor, substantially as described.

41. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, substantially as described.

42. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, substantially as described.

43. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, substantially as described.

44. In a system of the character descrbed, the combination with a plurality of electric motors with mechanism driven thereby, of means for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, with means for indicating at the distant point when the current is turned on to and off the motor, substantially as described.

45. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, with means for indicating at the distant point when the current is turned on to and off from each motor, substantially as described.

46. In a system of the character described, the combination with a plurality of electric motors with mechanism driven thereby, of means for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, with means for indicating at the distant point when the current is turned on to and off from each motor, substantially as described.

47. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, and a double pawl fast on the shaft of said balance-wheel and adapted to alternately engage said ratchet-wheels, and automatic mechanism for cutting off the current from any one of said motors when the load on said motor exceeds a predetermined limit, with means for indicating at the distant point when the current is turned on to and off from each motor, substantially as described.

48. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, substantially as described.

49. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, and automatic mechanism for cutting off the current from any one of said motors when the load on said motor exceeds a predetermined limit, substantially as described.

50. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, and automatic mechanism for cutting off the current from any one of said motors when the load on said motor exceeds a predetermined limit, substantially as described.

51. In a system of the character described, the combination with a plurality of electric motors with mechanism driven thereby, of means for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, with means for indicating at the distant point when the current is turned on to and off the motor, substantially as described.

52. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, with means for indicating at the distant point when the current is turned on to and off from each motor, substantially as described.

53. In a system of the character described, the combination with a plurality of electric motors with mechanism driven thereby, of means for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, and automatic mechanism for cutting off the current from any one of said motors when the load on said motor exceeds a predetermined limit, with means for indicating at the distant point when the current is turned on to and off from each motor, substantially as described.

54. In a system of the character described, the combination with a plurality of electric motors with mechanism driven thereby, of automatic step-by-step mechanism for turning on the current to said motors *seriatim* from a distant point, comprising a spring under tension, a sector-arm engaged by said spring, a conducting-segment and a train of gearing operated by said sector-arm, a pair of ratchet-wheels driven in reverse directions by said train of gearing, a balance-wheel, a double pawl fast on the shaft of said balance-wheel and adapted to alternately engage said ratchet-wheels, a hand-wheel shaft having a crank-arm thereon connected to said train of gearing, a hand-wheel mounted on said shaft, and a stop normally locking said hand-wheel and with it said train of gearing, with means for releasing said hand-wheel from said stop when desired, and automatic mechanism for cutting off the current from any one of said motors when the load on said motor exceeds a predetermined limit, with means for indicating at the distant point when the current is turned on to and off from each motor, substantially as described.

In testimony whereof I affix my signature in presence of two witnesses.

WILLIAM BARNUM COWLES.

Witnesses:
  W. J. SULIS,
  H. WATSON.